United States Patent [19]

Ujiie

[11] 4,180,250
[45] Dec. 25, 1979

[54] APPARATUS FOR GRANULATION OF MOLTEN SLAGS

[75] Inventor: Nobuhisa Ujiie, Tokyo, Japan

[73] Assignee: Ishikawajima-Harima Jukogyo Kabushiki Kaisha, Ote, Japan

[21] Appl. No.: 932,163

[22] Filed: Aug. 9, 1978

[30] Foreign Application Priority Data

Aug. 16, 1977 [JP] Japan .................................. 52-98505

[51] Int. Cl.² ............................................. F27D 15/02
[52] U.S. Cl. ...................................... 266/137; 65/141
[58] Field of Search .................... 65/141, 19; 266/137; 75/24, 0.5 C

[56] References Cited

U.S. PATENT DOCUMENTS 757,035  4/1904  Gramm .................................. 65/141

FOREIGN PATENT DOCUMENTS 518541  2/1940  United Kingdom ...................... 65/141

Primary Examiner—M. J. Andrews
Attorney, Agent, or Firm—Sughrue, Rothwell, Mion, Zinn and Macpeak

[57] ABSTRACT

Apparatus for the continuous granulation of molten slags produced in metallurgical furnaces such as blast furnaces, converters, electric furnaces, reverberatory furnaces and the like, and for recovering the heat of the molten slags, includes a vertically oriented conical bounce deflector 4 against whose non-wettable surface a plurality of circumferentially arranged molten slag jets 1 are directed.

5 Claims, 4 Drawing Figures

APPARATUS FOR GRANULATION OF MOLTEN SLAGS

DETAILED DESCRIPTION OF THE INVENTION

This invention relates to a granulator and a heat recovery apparatus for the continuous granulation of molten slags.

Because molten slags, particularly those produced upon refining metals in metallurgical furnaces such as blast furnaces, converters, electric furnaces, reverberatory furnaces, and the like, amount given off considerable quantity and to an enormous heat, there are demands for disposing of them in a non-polluting manner, for converting them into a useful substance, and for recovering the heat as an energy source. The distribution of granule size of the end product of such a conversion process may differ in accordance with the end use intended, but when it is light weight aggregate to be used in concrete making for civil engineering purposes, slag granules of a mean diameter of 2 to 3 mm, a maximum diameter about 5 mm, of a uniform size distribution, and of a strength roughly equal to that of river sands are preferred.

As for the method of granulation of said molten slags into said aggregates, a method that makes use of a phenomenon called the self granulation of molten slag by non-wetting bouncing is known to be successful. According to this method, the molten slag is projected in a continuously falling jet onto a target in such a way as to collide with the surface of said target at a certain specific velocity and to bounce off immediately therefrom without adhering thereonto, namely, without wetting said surface, so that a cone of molten slag film is formed at the point of collision with the normal to that surface as its axis of symmetry, the cone thus formed being degenerated at its open end into a series of discrete rings, which, in their turn, coagulate themselves while afloat in the air into many granules.

This series of events is schematically shown in FIG. 1, where the molten slag jet 1 is directed onto a rotating drum target 2, forming by non-wetting bouncing a cone of slag film of an apex $2\theta$ at the collision point A around the target surface normal B, from which granules 3 fly away in all directions evenly with regard to the normal B along the extension of the cone C.

To achieve self granulation by non-wetting bouncing, the target surface should be made of a hard, heat resisting, and heat conducting material such as iron, mild steel, stainless steel, copper, graphite, or ceramics which, if necessary, may be further reinforced with a hard facing by a surface such as aluminizing, parkerizing, chromium plating, carburizing, nitriding, or buttering of a superalloy. Further, the surface should be finished to a high degree of smoothness and kept clean and cool. Moreover, it is known that spraying or coating the collision surface with a film of a substance that prevents the adherence of molten slag on said surface such as water, aluminum powder paint, oil, lime milk, graphite powder paint is helpful to prepare the surface for, or restore it to, such duty. In the present disclosure, such a surface as described heretofore will be called the non-wetting surface, and such a substance that forms the adherence preventive film a non-wetting substance.

Even though a rotating drum target has been found generally satisfactory for this method, there is one shortcoming. Namely, since the aforesaid self granulation is governed mainly by the laws of fluid dynamics, the size of the molten slag jet 1 cannot be enlarged arbitrarily without altering other factors. This means that, in order to handle a large quantity of molten slag in a single apparatus, the number of the jets 1 has to be increased. This is schematically depicted in FIG. 2, where ellipses D denote the contour lines of the expanding granule cones C. It will be seen that, because the axes of symmetry B are parallel to each other, the granule cones C intersect each other even while the population of the granules is still dense, where mid-air collision of granules is frequent and many undesirably large granules are produced.

Thus, the primary purpose of this invention is to offer a granulator so improved as to be able to handle many slag jets without the occurrence of large granules. The secondary purpose is to offer an apparatus for recovering heat from the molten slag that is particularly well suited for said granulator. Other purposes of this invention will partly be explained, and will partly become obvious.

The present invention will become apparent from the following description of one preferred embodiment thereof taken in conjunction with the accompanying drawing, in which.

Figure 3:
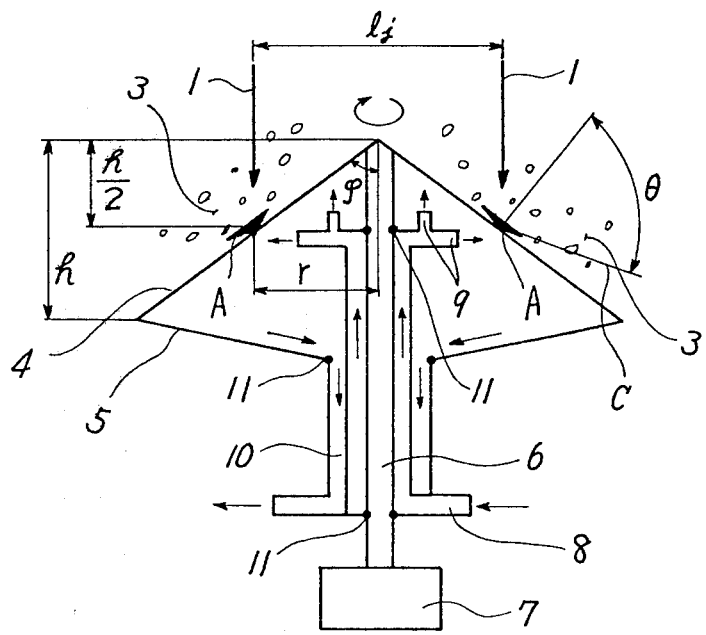
FIG. 3 is a schematic cross sectional view illustrating a preferred form of the conical granulator target.

A preferred form of the granulator according to this invention is shown in FIG. 3 by a schematic cross sectional view. In the figure, 4 is a conical target having a non-wetting surface on its upper or collision side, the axis of said cone being parallel to the molten slag jets 1 and the dimensions of the cone including an apex angle $2\phi$, a height h, and a radius 2r at the lower end; 5 is a base plate; 6 is a rotation shaft; 7 is a rotation drive mechanism; 8 is a coolant inlet conduit which surrounds the shaft 6 but remains stationary; 9 is a set of coolant jet nozzles; 10 is a coolant outlet conduit which surrounds the shaft 6 and the conduit 8 but remains stationary; and 11 are seals that connect the moving members 4 and 5 with the stationary members 8 and 10 water-tightly.

The molten slag is let fall from a tundish (not shown) through nozzles in the form of molten slag jets, the number of the nozzles, hence of the jets, and the disposition of them being such that a predetermined total amount of molten slag flow is divided more or less equally among the nozzles and the jets point downwards right at the target 4. The jets acquire the necessary collision velocity under the hydrostatic pressure of the tundish bath and through free fall, collide with the target 4 at respective collision points A, and disperse as granules 3 (yet molten) conically with an apex angle of 20° C. In the mean time, the target 4 is rotated slowly, say, several to several tens of revolutions per minute, by the driving mechanism 7 through the shaft 6, and is cooled from within by the coolant jet nozzles 9 with particular respect to the collision points or zone A. The target 4 may be made non-wetting by applying a non-wetting substance onto its collision surface by any known means, in which case the non-wetting substance can be made to work as an externally applied coolant as well.

Since no centrifugal effects of the target are relied upon in the granulation of molten slag according to this invention, the revolution of the target is simply to enhance the cooling. Therefore, the revolution speed of the target can be varied widely, and the target may even be held entirely stationary, provided either that the cooling is effectively done or that the surface remains non-wetting without any forced cooling such as when it is made of graphite or porcelain. As for the coolant, water is the most convenient medium, but any known coolants may be used. In any case, the coolant may be recirculated, if so desired, through a closed line composed of the inlet conduit 8, nozzles 9, base plate 5, and the outlet conduit 10 by a pump (not shown).

The necessary collision velocity should be determined for each slag in consideration of its viscosity and surface tension, but for blast furnace slags at about 1,400° C., it is known that collision velocities of 2 to 20 m/sec produce granules of mean diameters 4 to 1 mm. It is also known for those slags that the semi apex angle of the granule cone $\theta$ is about 60° to 80°, and that, when two collision points are separated by about 30 cm, practically no occurrence of undesirably large granules is to be feared even if the two cone axes are mutually parallel.

Now, if the number of nozzles, hence of the molten slag jets, is N, the distance between any two adjacent jets is lj, and the radius and the elevational position of the collision zone A are r and h/2, respectively, it can be shown that those quantities are all related in:

$$r = lj \, (2(1 - \cos 2\pi/N))^{-\frac{1}{2}}, \text{ and}$$

$$h = 2r/\tan\phi.$$

Here, it should be that, because what contributes to the self granulation is that component of collision velocity which is perpendicular to the target surface, $\phi$ should be taken as large as possible. On the other hand, however, the larger the $\phi$, the more complex will become the internal structure. Therefore, a $\phi$ between 60° to 80° is preferred.

Thus, if N=5, and taking r=45 cm and h=30 cm, then lj=52.9 cm and $\phi$=71.6°. Those figures satisfy the above-mentioned requirements.

Figure 4:
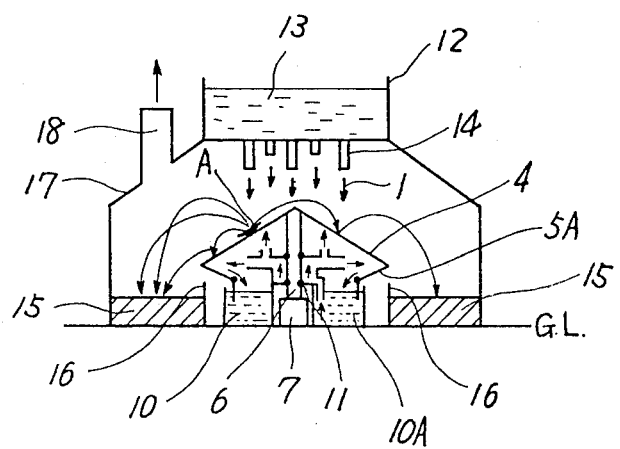
FIG. 4 is a schematic cross sectional view illustrating a preferred form of the heat recovery apparatus.

A preferred form of the heat recovery apparatus according to this invention is shown in FIG. 4 by a schematic cross sectional view. In the figure, 4 is a conical target which is substantially the same as that in FIG. 3 except for some minor modifications; 12 is a tundish; 13 is a molten slag bath; 14 is a set of nozzles; 15 is a granules cooler; 16 is a shield; 17 is a outer shell; and 18 is an uptake.

The molten slag is supplied from the source furnace (not shown) by any known means, either continually or intermittently, to the tundish 12, where the molten slag bath 13 is maintained at a predetermined depth range $h_s$. The design of nozzles 14 with regard to the target 4 is as described earlier, while in the target 4, the coolant outlet conduit 10 is now a coolant reservoir 10A, which, in conjunction with the base plate 5A, the open end of which is now dipped in the former, constitutes a coolant recirculation loop.

Figure 1:
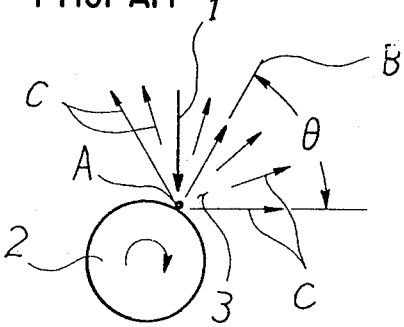
FIG. 1 is a schematic diagram illustrating the mechanism of self granulation on non-wetting bouncing.
Figure 2:
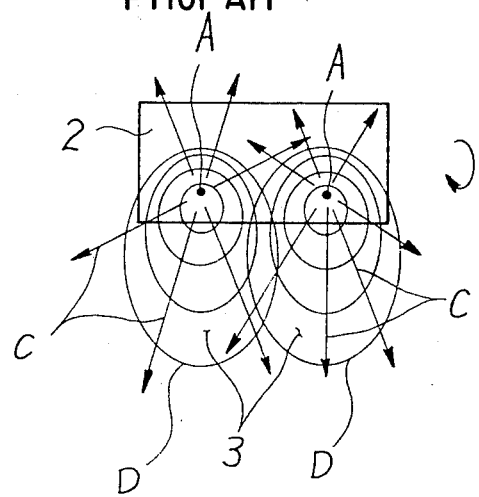
FIG. 2 is a schematic diagram illustrating the mechanism of occurrence of undesirably large granules.

The granules formed on the target surface will fall, directly or after some rebounds into the granules cooler 15. There are N discrete granule cones, each of which is oriented differently from another. Because of this, there is no intersecting of cones while the flying granules are densely populated, but, on account of eventual overlapping of cones and of rebouncing of individual granules, the distribution of the granules is practically uniform in the space over the cooler 15. For this reason, it is preferred to make the cooler 15 essentially in a ring form, and have it located concentrically with the target 4. It will be appreciated that, with the cooler 15 in this configuration, any granulator that produces granules symmetrically with respect to the cooler ring central axis, such as, for example, the horizontal drum target of FIG. 1. with the slag jet hitting right on the apex, may be employed.

The cooler 15 is preferably a fluidized bed type, the bed being composed of a powdery coolant such as hydro-granulated slag sand, crushed refractory brick, or graphite powder. The shield 16 provides a protection for the bed of the cooler 15 from getting wet by the splashes of the coolant in the reservoir 10A, and conversely for the coolant from becoming overheated by the high temperature gas generated art the bed. Further, the cooler 15 is provided with all such equipments (not shown) that are necessary to carry out heat exchange between incoming slag granules and a cooling-cum-fluidizing gas medium (for example, air or nitrogen), separation of cooled granules from the bed sand, and recovery of the cooled granules out of the cooler 15. Namely, the cooler 15 should be equipped at least with a fluidizing mechanism, a granules separator, a granules discharger, a powdery coolant feeder, and a coolant gas feeder, together with their controllers.

The conical target 4, the coolant reservoir 10A, and the granules cooler 15 with its associated equipments are all encased in the shell 17 in conjunction with the tundish 12. The shell 17 is provided with the uptake 18, through which the heated gas within the shell is led to a known heat utilization apparatus (not shown) such as, for example, a waste heat boiler. The inside of the shell 17 may be lined with a heat resisting, heat insulating, and preferably, non-wetting material. Graphite, porcelain, and, though not particularly heat insulating, water-jacketed metal plates are good for this purpose. It will be understood that this apparatus is capable of extracting both the sensible heat and the latent heat of the slag.

The basic designing procedure of an apparatus according to FIGS. 3 and 4 for disposal of a blast furnace slag of 1,400° C. at 30 ton/hr is as follows. In order to obtain granules of a mean diameter 2 to 3 mm, the factors that have to be determined are: q, the rate, and $v_1$, the velocity of molten slag flow through the nozzles 14; $h_t$, the elevation of the lower end of tundish 12 as measured from the surface of the fluidized bed of the granules cooler 15; $h_s$, the depth of the molten slag bath 13 that represents the desired depth range; $h_n$, the distance between the lower end of the bath 13 and the lower end of the nozzles 14, which is equal to the sum of the thickness of the tundish bottom $t_t$ and the length of the nozzles $l_n$, namely $h_n = t_t + l_n$; $h_p$, the distance between the lower end of the nozzles 14 and the apex of the conical target 4; $r_n$, the radius of nozzles 14, $h_f$, the distance between the lower end of the target 4 and the surface of the fluidized bed of the granules cooler 15; IR, the inner radius of the granules cooler 15, which may be taken as equal to the radius of the target 4 at its lower end; and OR, the outer radius of the granules cooler 15, which may be taken as equal to the inner radius of the shell 17.

Now, if one chooses N to be 5, then q=100 kg/min, for this $r_n$=7.5 mm, $h_s$=45 cm, $h_n$=22 cm, and $h_p$=85 cm will give rise to a $v_1$ of 3.6 m/sec and a $v_o$ of 8.1 m/sec, a collision velocity that satisfies the aforesaid requirements. Thus, if $t_t=12$ cm, $l_n=10$ cm.

Further, if $h_f=50$ cm, $h_t=h_f+h+h_p-t_t=1.75$ m, OR=5.1 m, and IR=90 cm (=2r). Here, the figure of OR was calculated so that all the granules would fall into the fluidized bed of the cooler 15 without touching the shell 17. Therefore, by making the inner surface of the shell 17 non-wetting as described earlier, thus making the granules rebound downwardly thereat, one may reduce the OR to as close to IR as one desires.

Any number of modifications are possible without deviating from the principles of this invention. For example, the conical target 4 may be truncated; the collision points may be selected anywhere on the target; because the granules do not, in a normal course of operations, reverse themselves once the flight course is given, the bottom plate 5 may be entirely dispensed with; or, by making the granules cooler 14 a moving bed type and providing a heat exchanger within said bed, the cooling medium for heat recovery at the cooler 15 may then be selected entirely different from and independent of the gas within the shell 17. Further, the granules cooler 15 may be subdivided into several units, each working independent of another.

As described heretofore, the granulator and the heat recovery apparatus of this invention feature a high productivity because of its ability to handle a large quantity of molten slag at a time, the usefulness in the save-energy and the save-resources because of its ability to convert the slag, otherwise a mere waste, into a profitable substance and an equally profitable source of thermal energy, the non-pollutivity thanks to its enclosed structure that prevents free escape of dusts and noxious gases, and the low costs of fabrication, errection, and maintenance thanks to its simple and rugged design.

What is claimed is:

1. An apparatus for the self granulation of molten slags by a non-wetting bounce technique, comprising:
   (a) a conical target having a vertical axis,
   (b) the surface of said target being made of a hard material finished to a high degree of smoothness and having a high degree of heat resistance and a high coefficient of thermal conductivity,
   (c) a tundish bath containing molten slags disposed above said target, and
   (d) a plurality of outlet nozzles mounted in openings in the bottom of said bath for gravationally forming an equal plurality of individual discharge jets of molten slag,
   (e) said nozzles having vertical axes parallel to the axis of said conical target and being oriented to direct the slag jets onto the conical target surface at circumferentially spaced positions therearound.

2. Apparatus as set forth in claim 1, further comprising coolant jet nozzles for projecting a coolant toward an inner side of the conical target, a coolant inlet conduit connected to the nozzles, and means for collecting spent coolant and recirculating it to the inlet conduit.

3. Apparatus as set forth in claims 1 or 2, further comprising, a slag granules cooler disposed under the conical target and concentrically surrounding it in the form of an annular ring, a shell enclosing the conical target and the slag granules cooler in cooperation with the tundish bath, and an uptake conduit for exhausting high temperature gas to a heat utilization apparatus.

4. Apparatus as set forth in claim 3, wherein the apex angle of the conical target is 120° to 160°.

5. Apparatus as set forth in claims 1 or 2, wherein the apex angle of the conical target is 120° to 160°.

* * * * *